(12) United States Patent
Chen

(10) Patent No.: US 11,487,256 B2
(45) Date of Patent: Nov. 1, 2022

(54) METHOD AND TERMINAL EQUIPMENT FOR PLANTING VEGETABLES ON INTERNET RENTAL LAND

(71) Applicant: Liping Chen, Yunfu (CN)

(72) Inventor: Liping Chen, Yunfu (CN)

( * ) Notice: Subject to any disclaimer, the term of this patent is extended or adjusted under 35 U.S.C. 154(b) by 407 days.

(21) Appl. No.: 16/819,216

(22) Filed: Mar. 16, 2020

(65) Prior Publication Data

US 2020/0218212 A1    Jul. 9, 2020

(51) Int. Cl.
| | | |
|---|---|---|
| *G05D 11/00* | (2006.01) | |
| *G05B 19/042* | (2006.01) | |
| *H04N 7/18* | (2006.01) | |
| *G06Q 50/16* | (2012.01) | |
| *G06Q 20/10* | (2012.01) | |
| *G06Q 50/02* | (2012.01) | |
| *A01G 25/16* | (2006.01) | |
| *A01C 21/00* | (2006.01) | |

(52) U.S. Cl.
CPC ........... *G05B 19/042* (2013.01); *G06Q 20/10* (2013.01); *G06Q 50/02* (2013.01); *G06Q 50/163* (2013.01); *H04N 7/185* (2013.01); *A01C 21/00* (2013.01); *A01G 25/16* (2013.01); *G05B 2219/2625* (2013.01)

(58) Field of Classification Search
CPC ................. A01M 17/00; G05B 19/042; G05B 2219/2625; A01C 21/00; G06Q 20/10; G06Q 50/02; G06Q 50/163; H04N 7/185; A01G 25/16

See application file for complete search history.

(56) References Cited

U.S. PATENT DOCUMENTS

2013/0185104 A1* 7/2013 Klavins ................. A01M 17/00
705/7.12

OTHER PUBLICATIONS

He et al, CN 105991703, "O2o Remote Intelligent Farm Planting System" (translation), Oct. 5, 2016, 8 pgs <CN_105991703.pdf>.*
Zhu, CN 104914811, "A Network Rental System" (translation), Apr. 6, 2018, 10 pgs <CN_104914811.pdf>.*
Cheng, CN 109377311, "A Farm Sharing Method and Server" (translation), Feb. 22, 2019, pp. 1-7 <CN_109377311.pdf>.*

* cited by examiner

*Primary Examiner* — Tuan A Vu

(57) ABSTRACT

The invention relates to a method and terminal equipment for planting vegetables on internet rental land, thereby enabling land lessees with idle land to cooperate with urban people seeking to eat green vegetables which are economical and practical, on the one hand, meeting the requirement that urban people eat green vegetables which are practical and reliable, on the other hand, enabling idle land to be reasonably utilized, especially wasting land in rural areas, and bringing considerable benefits to the land lessees; meanwhile, along with the popularization and application of the method and the terminal equipment, a large number of employment posts can be brought to rural areas, and the economic development of the rural areas can be promoted.

7 Claims, 3 Drawing Sheets

METHOD AND TERMINAL EQUIPMENT FOR PLANTING VEGETABLES ON INTERNET RENTAL LAND

TECHNICAL FIELD

The present application relates to the fields of vegetable planting in rental land, and particularly relates to a method and terminal equipment for planting vegetables on internet rental land.

BACKGROUND

People living in cities will encounter a problem, namely food safety. Although the safety of the green food is guaranteed, the green food is expensive and difficult to adapt to common consumer groups. In order to enjoy safe and beneficial green food, such as green vegetables, some urban residents can consider self-planting and self-sufficient food, but the planting efficiency is low, the labor cost is high, and the management is inconvenient. In addition, there is a problem in that urban land resources are lacking and it is difficult to satisfy with all of these self-planting people.

At the same time, many people living in rural areas, because of the low income in rural areas and the lack of money-earning types of work, also caused a large number of rural population away from rural wells, thousands of miles, to the city to work for livelihood, on the one hand, will undoubtedly increase the density of urban population, poor living environment, leisure and unemployed population, on the other hand, the rural areas become rare, a large amount of land will be abandoned idle.

As can be seen, at least the following problems exist in the prior art: there is no implementation scheme of how to coordinate green food planting and idle land use.

Therefore, it is necessary to provide a technical means to solve the above-mentioned problems.

SUMMARY

The present application aims to provide a method and terminal equipment for planting vegetables on Internet rental land, and aims to solve the problem in the prior art that the implementation scheme of coordination and cooperation between green food planting and idle land use is lacking.

In order to solve the above technical problem, the embodiments of the present application provide a method for planting vegetables on Internet rented land comprises the following steps:

acquiring land information of a land renting owner, the area specification of the land rented by the land renting owner is specified, and a remotely controllable vegetable planting tool is required to be installed on the land with the specified area specification;

acquiring information that a tenant rents land to remotely plant vegetables;

sending confirmation information to the tenant, collecting money required by the tenant, and dividing the collected money into corresponding land renters according to an agreement manner, controlling the vegetable planting tool to carry out corresponding vegetable planting operation on the land selected by the tenant according to the vegetable planting information sent by the tenant, wherein the vegetable planting operation comprises sowing, watering, fertilizing, deinsectization and vegetable collection;

acquiring the information that the tenant sends the vegetables which the tenant appoints to collect, and sending the vegetables of the tenant to an appointed place according to the information.

The embodiments of the present application also provide an Internet rental land vegetable planting terminal device comprising a memory, a processor and a computer program stored in said memory and executable on said processor, characterized in that said processor, when executing said computer program, carries out the steps of the method as described above.

According to the technical solution provided by the present application, the method has the advantages that land lessees with idle land can cooperate with urban people who seek economic and practical green vegetables, so that on one hand, the urban people can eat the practical and reliable green vegetables, on the other hand, the idle land can be reasonably utilized, especially the rural abandoned land, and considerable benefits are brought to the land lessees; meanwhile, along with the popularization and application of the method, a large number of employment posts can be brought to rural areas, and the economic development of the rural areas can be promoted.

BRIEF DESCRIPTION OF THE DRAWINGS

To better describe the technical solution in the embodiments of the present application, accompanying drawings needed in the implementation are simply illustrated below; obviously, accompanying drawings described hereinafter illustrate some implementations of the present application; for the ordinary skill in the field, other accompanying drawings may be obtained according to these accompanying drawings without creative work.

DESCRIPTION OF THE EMBODIMENTS

A clear and complete description as below is provided to the technical scheme in the embodiments of the present application in conjunction with the accompanying drawings in the embodiments of the present application. It should be appreciated that the embodiments described hereinafter are simply part embodiments of the present application, but all the embodiments. All other embodiments obtained by the ordinary skill in the art based on the embodiments in the present application without creative work are intended to be included in the scope of protection of the present application.

In the description of the embodiments of the present application, it should be appreciated that directional or positional relations indicated by terms such as "thickness", "left", "right", "up", "down", etc are directional or positional relations shown based on the drawings, merely to conveniently describe the present application and simplify the description, but not to indicate or imply the designated device or element to be constructed and operated in a specific position or in a specific direction; therefore, the used directional terms cannot be understood as a restriction to the present application.

Figure 1:
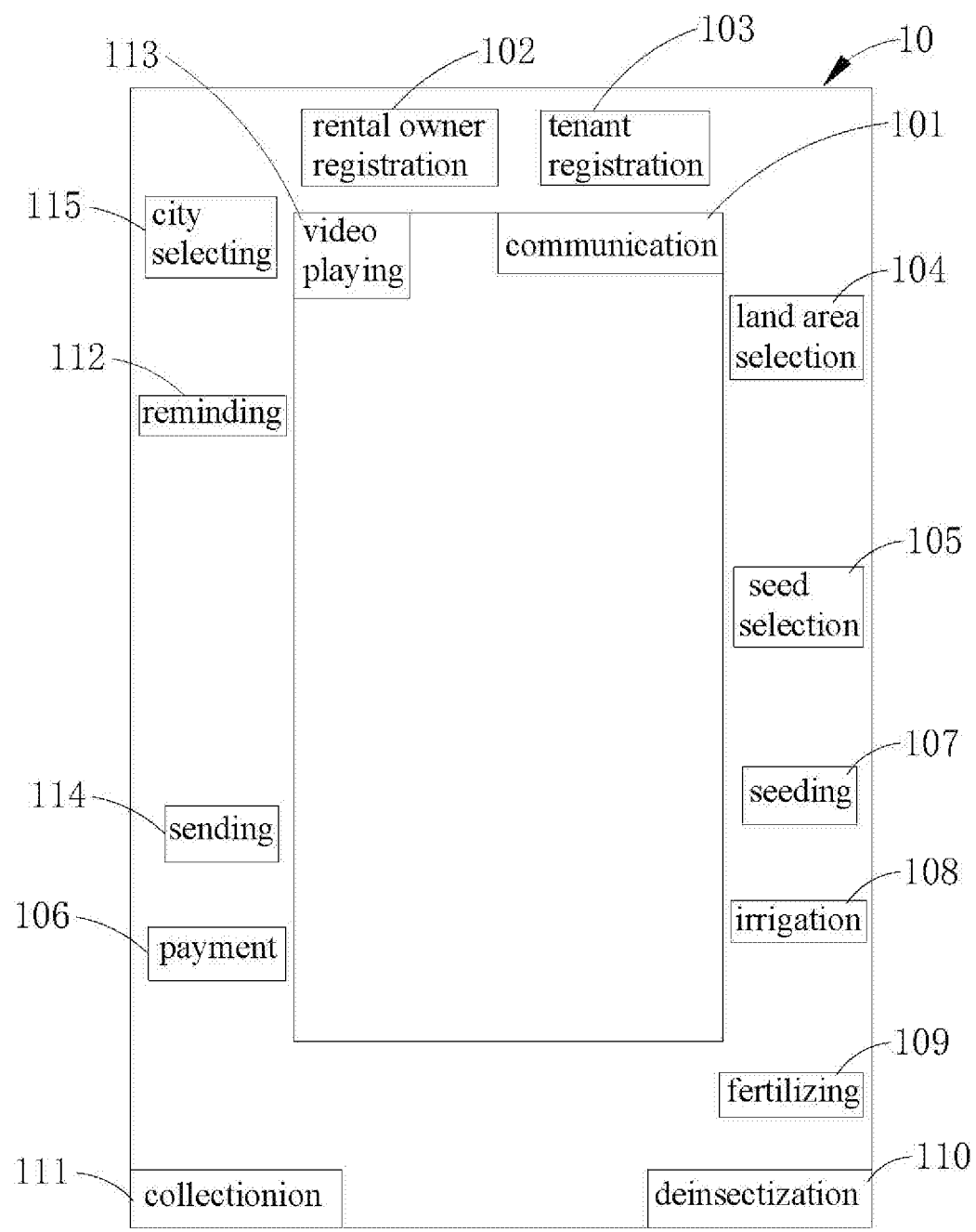
FIG. 1 is a schematic diagram of a user interface of a vegetable remote planting platform in a method for planting vegetables on an Internet rental land according to an embodiment of the present invention.
Figure 2:
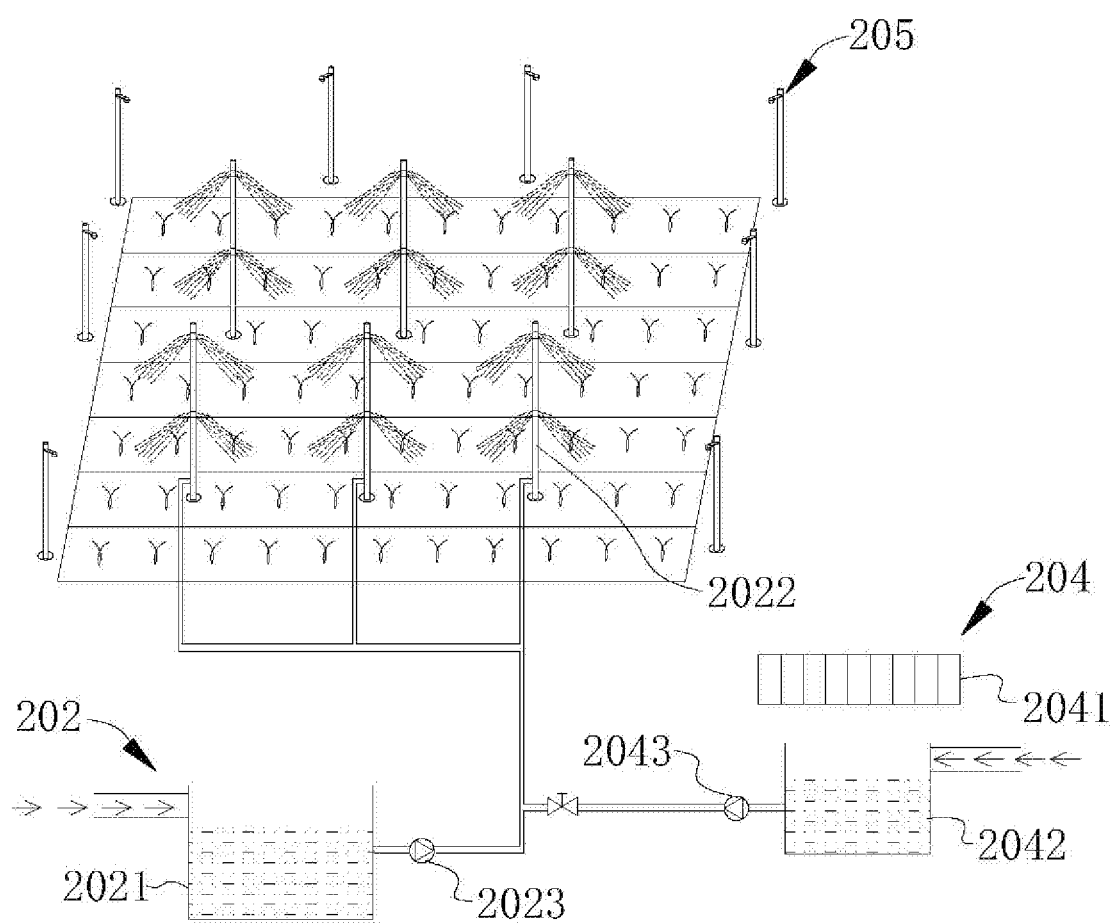
FIG. 2 is a schematic view showing vegetables planted in a method for planting vegetables in an Internet rental land according to an embodiment of the present invention.
Figure 3:
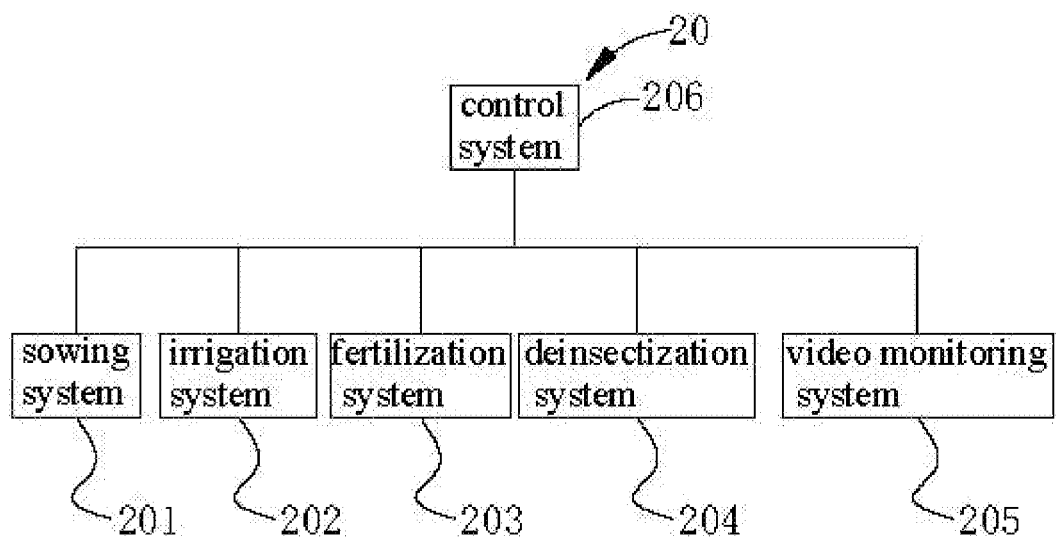
FIG. 3 is a schematic view illustrating control of a vegetable planting tool in a method for planting vegetables on an Internet rental land according to an embodiment of the present invention.

Referring to FIGS. 1 to 3, a preferred embodiment of the present invention relates to an Internet rental land vegetable planting method, comprising the following steps:

S101, acquiring land information of a land renting owner,

S102, specifying the area specification of the land rented by the land renting main, and installing a remotely controllable vegetable planting tool 20 on the land with the specified area specification;

S1103, acquiring information that a tenant rents land to remotely plant vegetables;

S104, sending confirmation information to the tenant, collecting money required by the tenant, and dividing the collected money into corresponding land renters according to an agreement manner, S105, controlling the vegetable planting tool 20 to perform corresponding vegetable planting operation on the land selected by the tenant according to the vegetable planting information sent by the tenant, wherein the vegetable planting operation comprises sowing, watering, fertilizing, deinsectization and vegetable collection;

S106, acquiring the information that the tenant sends the vegetables which the tenant appoints to collect, and sending the vegetables of the tenant to the appointed place according to the information.

Therefore, the land lessor with the idle land can cooperate with urban people who seek economic and practical green vegetables, so that on one hand, the urban people can eat the practical and reliable green vegetables, on the other hand, the idle land can be reasonably utilized, especially the rural abandoned land, and considerable benefits are brought to the land lessor, meanwhile, along with the popularization and application of the method and the terminal equipment, a large number of employment posts can be brought to rural areas, and the economic development of the rural areas can be promoted.

Referring to FIGS. 1 to 3, another preferred embodiment of the present invention relates to a system for renting land-grown vegetables on the Internet, which serves a customer group including a land lessor who owns idle land and urban people (tenants) who seek to eat economically viable green vegetables. It should be noted that the system for renting land for vegetable planting on the Internet can be designed as a corresponding mobile phone APP, where by the land renter and the renter can download the APP of the vegetable remote planting platform 10 mainly through the mobile phone. In particular, the system for planting vegetables on the Internet rental land comprises:

a communication module 101, is used for interactive communication between the tenant and the land renting master and/or the platform manager;

a rental owner registration module 102, is used for registering personal information of the land rental owner, a tenant registration module 103, is used for registering personal information of the tenant;

a land area selection module 104, is used for a tenant to select land with different area specifications;

a vegetable seed selection module 105, is used for a tenant to select different types of vegetable seeds; the vegetable seeds comprise Chinese cabbage seeds, vegetable heart seeds, mustard seeds and other seeds;

a payment module 106, is used for the tenant to pay the required payment to the platform;

a seeding module 107, is used for a tenant to seed the vegetable seeds selected by the tenant on the land with the selected area specification;

a irrigation module 108, is used for a tenant to irrigate the land planted by the tenant or vegetables grown from the land;

a fertilizing module 109, is used for a tenant to fertilize the land planted by the tenant or vegetables grown from the land;

a deinsectization module 110, is used for a tenant to deinsectize vegetables grown on the selected land;

a collection module 111, is used for collecting vegetables grown on the selected land by a tenant;

a reminding module 112, is used for reminding a tenant to perform one or at least two or more operations of irrigation, fertilization, deinsectization, collection and payment;

a video playing module 113, is used for a tenant to watch a planting site corresponding to the selected land;

a sending module 114, is used for sending the vegetables collected by the tenant to a designated place.

The land lessor may be a farmer or a land investor who owns the land and has the right to use the land. At the same time, it is necessary to uniformly specify the area specification of the land, and to install the remotely controllable vegetable planting tool 20 on the land of the specified area specification.

The vegetable growing tool 20 includes a seeding system 201, a watering system 202, a fertilizing system 203, a deinsectization system 204, a video monitoring system 205, and a control system 206, the portions of the vegetable growing tool 20 are further described below: The sowing system 201 is arranged on the side edge of the land to be planted and is used for sowing the land to be planted; among other things, the sowing system 201 may be a prior art sowing machine;

a irrigation system 202, is arranged on the land required to be planted and is used for irrigating vegetables grown from the land required to be planted;

a fertilization system 203, is arranged on the land required to be planted and is used for fertilizing vegetables grown from the land required to be planted;

a deinsectization system 204, is arranged on the land required to be planted and is used for deinsectizing vegetables grown from the land required to be planted;

a video monitoring system 205, is arranged on the land required to be planted and is used for monitoring vegetables grown from the land required to be planted; the video monitoring system 205 comprises a plurality of monitoring components, wherein the plurality of monitoring components are uniformly arranged on the side edge of the land to be planted;

a control system 206, is electrically connected with the sowing system 201, the irrigation system 202, the fertilization system 203, the deinsectization system 204 and the video monitoring system 205, respectively, so that the operation of the sowing system 201, the irrigation system 202, the fertilization system 203, the deinsectization system 204 and the video monitoring system 205 can be controlled.

Accordingly, the seeding module 107 is electrically connected to the seeding system 201, the irrigation module 108 is electrically connected to the irrigation system 202, the fertilization module 109 is electrically connected to the fertilization system 203, the deinsectization module 110 is electrically connected to the deinsectization system 204, and the video playback module 113 is electrically connected to the video monitoring system 205 so that a tenant can pass through the seeding module 107, the irrigation module 108 and the fertilization module 109 on the vegetable remote planting platform 10. The deinsectization module 110 and the video playing module 113 correspondingly control the operation of the seeding system 201, the irrigation system 202, the fertilization system 203, the deinsectization system 204 and the video monitoring system 205.

Specifically, when the selected land needs to be sown, the user can control the operation of the sowing system 201 through the sowing module 107 on the vegetable remote planting platform 10, and the sowing system 201, after receiving the control command, performs the sowing operation on the selected land. In order to irrigate vegetables grown from the selected land, the user may control the operation of the irrigation system 202 through the irrigation module 108 on the vegetable remote planting platform 10, and after the irrigation system 202 receives the control command, the selected land may be irrigated. In order to fertilize vegetables grown from the selected land, a user can control the fertilizing system 203 to work through the fertilizing module 109 on the vegetable remote planting platform 10, and the fertilizing system 203 can fertilize the selected land after receiving the control instruction. In order to deinsectize vegetables grown from the selected land, a user can control the deinsectization system 204 to work through the deinsectization module 110 on the vegetable remote planting platform 10, and the deinsectization system 204 can perform deinsectization operation on the selected land after receiving the control instruction. When vegetables growing out of the selected land are monitored, the video playing module 113 on the vegetable remote planting platform 10 controls the video monitoring system 205 to work, and the video monitoring system 205 carries out video monitoring operation on the selected land after receiving the control instruction.

As described above, the establishment and promotion of a system for renting land and planting vegetables through the Internet enables land renters who have idle land to cooperate with urban people who seek to eat green vegetables which are economical and practical, so that on one hand, urban people can eat green vegetables which are practical and reliable, on the other hand, idle land can be reasonably utilized, especially abandoned land in rural areas. moreover, considerable benefits are brought to the land renters; meanwhile, along with the popularization and application of the business model, a large number of employment posts can be brought to rural areas, and the economic development of the rural areas can be promoted.

Preferably, to facilitate tenant payment, the payment module 106 includes a swipe payment and/or an online banking transfer payment, wherein the swipe payment may be a payment treasure swipe payment or a micro-credit swipe payment.

In addition, the fertilization module 109 comprises an inorganic fertilizer application and an organic fertilizer application, so that different fertilization requirements of a tenant on vegetables remotely planted by the tenant can be met, and for the service operation of fertilization, the vegetable remote planting platform 10 can make a collection fee and divide the collection fee with a land renting owner, meanwhile, for the selection of the respective types of the inorganic fertilizer and the organic fertilizer, a charging item list can be formulated. Accordingly, fertilizer application system 203 includes an inorganic fertilizer application system and an organic fertilizer application system.

Referring to FIG. 2, the irrigation system 202 of the present embodiment is preferably constructed to include a reservoir 2021 for storing water or other liquid, a spray pipe 2022 for spraying the liquid of the reservoir onto vegetables on the ground, and an irrigation power pump 2023 for delivering the liquid of the reservoir to the spray pipe 2022, the irrigation power pump 2023 being connected to the reservoir 2021 and the spray pipe 2022, respectively. The liquid stored in the liquid storage tank 2021 comprises domestic wastewater, rainwater or river water so as to reasonably utilize water resources.

Thus, when a tenant is to irrigate vegetables growing on its selected land, as long as the tenant touches the irrigation module 108 on the vegetable remote planting platform 10, the irrigation module 108 controls the operation of the irrigation system 202, specifically, the operation of the irrigation power pump 2023, which then sends the liquid from the reservoir 2021 to the spray pipe 2022, which then sprays the liquid on the vegetables.

Meanwhile, the deinsectization system 204 includes a plurality of holding containers 2041 for holding different deinsectization agents, a dissolving tank 2042 for dissolving the agents to form deinsectization solutions, a delivery mechanism (not shown) for delivering the required agents to the dissolving tank 2042, and a deinsectization power pump 2043 for delivering the liquid of the dissolving tank 2042 to the spray pipe 2022, the deinsectization power pump 2043 and the dissolving tank 2042, respectively, spray pipe connection. The delivery mechanism can be a gripper mechanism or a manipulator in the prior art.

Therefore, when a tenant wants to deinsectize vegetables grown on the selected land, the deinsectization module 110 controls the deinsectization system 204 to work as long as the tenant touches the deinsectization module 110 on the vegetable remote planting platform 10, specifically, the delivery mechanism starts to work, and then the tenant can take out the deinsectization agent required by the tenant from the containing container 2041 and deliver the deinsectization agent to the dissolving tank 2042; next, the dissolving tank 2042 introduces a required amount of liquid water and dissolves the deinsectization agent to form an deinsectization solution; next, the deinsectization power pump 2043 is started, and then the deinsectization solution of the dissolving tank 2042 is sent to the spray pipe 2022, and then the deinsectization solution is sprayed on the vegetables through the spray pipe 2022 for deinsectization and disinsection.

Referring to FIG. 1, there is shown another preferred embodiment of the present invention having the embodiments described above, wherein reference is made to the above description for a specific embodiment of the above embodiments, which will not be repeated here; however, in the present embodiment, it differs from the above-mentioned embodiment in that:

the vegetable remote planting platform 10 in the embodiment further comprises a city selecting module 115 for renters to select different cities, wherein the renters can select the required cities through the city selecting module 115, different cities have different climate environments, the land forms unique characteristics according to the geographical environment of the city, and therefore vegetables grown on the land with different characteristics also have different characteristics; meanwhile, a tenant can conveniently select a near place to remotely plant vegetables according to the city where the tenant is located, so that vegetables can be collected and quickly conveyed to a designated place.

Figure 4:
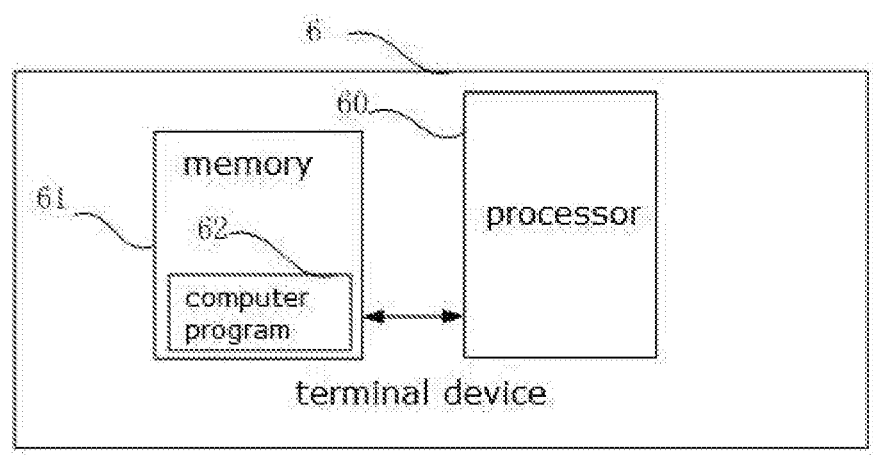
FIG. 4 is a schematic diagram of an Internet rental land vegetable planting terminal device provided by an embodiment of the present application.

Referring to FIG. 4, the present invention also provides another embodiment relating to an Internet rental land vegetable planting terminal device 6 comprising a memory 61, a processor 60 and a computer program 62 stored in the memory 61 and executable on the processor 60, the processor 60 executing the computer program 62 to carry out the steps of the method of the above embodiment.

The processor 60, when executing the computer program 62, performs the steps in the various component size measurement method embodiments described above, such as steps S101 to S103 shown in FIG. 1. Alternatively, the processor 60, when executing the computer program 62, performs the functions of the various modules/units of the various apparatus embodiments described above.

Illustratively, the computer program 62 may be partitioned into one or more modules/units that are stored in the memory 61 and executed by the processor 60 to complete the present application. The one or more modules/units may be a series of computer program instruction segments capable of performing specific functions for describing the execution of the computer program 62 in the Internet rental land vegetable planting terminal device 6. For example, the computer program 62 may be partitioned into units having the following specific functions:

the terminal equipment 6 for leasing land and planting vegetables through the Internet can be computing equipment such as a desktop computer, a notebook computer, a palm computer and a cloud server. The terminal apparatus 6 for renting land planting vegetables on the Internet may include, but is not limited to, a processor 60, and a memory 61. It will be understood by those skilled in the art that FIG. 4 is merely an example of an Internet rental land-planted vegetable terminal device 6 and does not constitute a definition of the Internet rental land-planted vegetable terminal device 6, and may include more or fewer components than shown, or may combine certain components, or different components, such as the Internet rental land-planted vegetable terminal device 6 may also include an input output device, a network access device, a bus, etc.

The processor 60 may be a central processing unit (CPU) or other general purpose processor, a digital signal processor (DSP), an application specific integrated circuit (ASIC), a field-programmable gate array (FPGA) or other programmable logic device, discrete gate or transistor logic device, discrete hardware components, etc. A general purpose processor may be a microprocessor or the processor may be any conventional processor or the like.

The memory 61 may be an internal storage unit of an Internet rental land vegetable planting terminal device 6, such as a hard disk or a memory of the Internet rental land vegetable planting terminal device 6. The memory 61 may also be an external storage device of an Internet rental land planting vegetable terminal device 6, such as a plug-in hard disk, a Smart Media Card (SMC), a Secure Digital (SD) card, a Flash Card, etc. provided on the Internet rental land planting vegetable terminal device 6. Further, the memory@@ 1 may also include both an internal storage unit and an external storage device of the Internet rental land planting vegetable terminal device 6. The memory 61 is used for storing the computer program and other programs and data required by the Internet rental land vegetable planting terminal device 6. The memory 61 may also be used to temporarily store data that has been or will be output.

It will be clear to a person skilled in the art that, for convenience and conciseness of description, only the above-mentioned division of functional units and modules is exemplified, and in practical applications, the above-mentioned distribution of functions can be performed by different functional units and modules, i.e. dividing the internal structure of the device into different functional units or modules, as required, to perform all or part of the functions described above. The functional units and modules in the embodiments may be integrated in one processing unit, may be physically separate from each other, or may be integrated in one unit in two or more units, either in the form of hardware or in the form of software functional units. In addition, the specific names of the various functional units and modules are merely for convenience of mutual distinction and are not intended to limit the scope of protection of the present application. The specific operation of the units and modules in the above-described system may be made with reference to corresponding processes in the above-described method embodiments, which will not be described in detail herein.

In the embodiments described above, emphasis has been placed upon describing various embodiments, and portions of one embodiment that are not described or illustrated may be had by reference to other embodiments.

Those of ordinary skill in the art will appreciate that the various illustrative elements and algorithm steps described in connection with the embodiments disclosed herein may be implemented as electronic hardware, or combinations of computer software and electronic hardware. Whether such functionality is implemented as hardware or software depends upon the particular application and design constraints imposed on the particular implementation. Skilled artisans may implement the described functionality in varying ways for each particular application, but such implementation is not intended to exceed the scope of the present application.

In the embodiments provided herein, it should be understood that the disclosed apparatus/terminal devices and methods may be implemented in other ways. For example, the apparatus/terminal device embodiments described above are merely illustrative, e.g., a division of the modules or elements into only one logical function, and there may be additional divisions in actual implementation, e.g., multiple elements or components may be combined or integrated into another system, or some features may be omitted, or not performed. Alternatively, the couplings or direct couplings or communicative connections shown or discussed with respect to one another may be indirect couplings or communicative connections through some interface, device or unit, and may be electrical, mechanical or otherwise.

The elements described as separate elements may or may not be physically separate, and the elements shown as elements may or may not be physical elements, i.e. may be located one place, or may be distributed over a plurality of network elements. Some or all of the elements may be selected to achieve the objectives of the inventive arrangements according to practical requirements.

In addition, each functional unit in each embodiment of the present application may be integrated in one processing unit, each unit may be physically present separately, or two or more units may be integrated in one unit. The integrated units described above can be implemented either in hardware or in software functional units.

The integrated module/unit, if implemented in the form of a software functional unit and sold or used as a stand-alone product, may be stored in a computer-readable storage medium. Based on this understanding, the present application is capable of implementing all or part of the processes of the embodiments described above, and may be implemented by computer programs, which may be stored in a computer-readable storage medium and which, when executed by a processor, carry out the steps of the various embodiments of the methods described above. Therein, the computer program comprises computer program code, which may be in the form of source code, object code, executable files or some intermediate form, etc. The computer-readable medium may include: any entity or device capable of carrying the computer program code, recording media, U-disk, removable hard disk, magnetic disk, optical disk, computer memory, read-only memory (ROM), random access memory (RAM), electrical carrier wave signals, telecommunications signals, and software distribution media. It should be noted that the computer-readable medium may contain content that may be appropriately augmented or subtracted as required by legislation and patent practice within judicial jurisdictions, e.g., in certain jurisdictions, in accordance with legislation and patent practice, the computer-readable medium does not include electrical carrier wave signals and telecommunications signals.

The above-described embodiments are merely illustrative of the technical solutions of the present application and are not intended to be limiting thereof; although the present application has been described in detail with reference to the foregoing embodiments, those skilled in the art will appreciate that: the technical solutions of the above-mentioned embodiments can still be modified, or some of the technical features thereof can be equivalently replaced; such modifications and substitutions do not depart from the spirit and scope of the embodiments of the present invention, and are intended to be included within the scope of this application.

What is claimed is:

1. A method for planting vegetables on Internet rental land, which is characterized by comprising the following steps:

acquiring land information of a land renting owner; wherein the area specification of the land rented by the land renting owner is specified, and a remotely controllable vegetable planting tool is required to be installed on the land with the specified area specification;

acquiring information that a tenant rents land to remotely plant vegetables;

sending confirmation information to the tenant, collecting money required by the tenant, and dividing the collected money into corresponding land renters according to an agreement manner, controlling the vegetable planting tool to carry out corresponding vegetable planting operation on the land selected by the tenant according to the vegetable planting information sent by the tenant, wherein the vegetable planting operation comprises sowing, watering, fertilizing, deinsectization and vegetable collection;

acquiring the information that the tenant sends the vegetables which the tenant appoints to collect, and sending the vegetables of the tenant to an appointed place according to the information.

2. The method for planting vegetables on the Internet rental land according to claim 1, wherein collecting the money required by the tenant through code sweeping payment.

3. The method for planting vegetables on the Internet rental land according to claim 1, wherein collecting the money required by the tenant through online bank transfer payment.

4. The method for planting vegetables on the Internet rental land according to claim 1, wherein the vegetable planting tool comprises a sowing system, a watering system, a fertilizing system, a deinsectization system, a video monitoring system and a control system, wherein the control system is electrically connected with the sowing system, the watering system, the fertilizing system, the deinsectization system and the video monitoring system respectively so as to control the working of the sowing system, the watering system, the fertilizing system, the deinsectization system and the video monitoring system.

5. The method for planting vegetables on the Internet rental land according to claim 4, wherein the irrigation system comprises a liquid storage tank used for storing water or other liquids, a spray pipe used for spraying the liquid of the liquid storage tank on vegetables on the ground, and an irrigation power pump used for conveying the liquid of the liquid storage tank to the spray pipe, wherein the irrigation power pump is respectively connected with the liquid storage tank and the spray pipe.

6. The method for planting vegetables on the Internet rental land according to claim 4, wherein the deinsectization system comprises a plurality of containing containers for containing different deinsectization medicaments, a dissolving tank for dissolving the medicaments to form deinsectization solutions, a delivery mechanism for delivering the required medicaments to the dissolving tank, and a deinsectization power pump for delivering the liquid in the dissolving tank to the spray pipe, wherein the plurality of containing containers are arranged above the dissolving tank, and the deinsectization power pump and the dissolving tank are respectively provided; and the spray pipe is connected.

7. An Internet rental land vegetable planting terminal device comprising a memory, a processor and a computer program stored in the memory and executable on the processor, characterized in that the processor, when executing the computer program, carries out the steps of the method according to claim 1.

* * * * *